US008653885B2

(12) United States Patent
Fort et al.

(10) Patent No.: US 8,653,885 B2
(45) Date of Patent: Feb. 18, 2014

(54) DEVICE FOR GENERATING A REFERENCE CURRENT PROPORTIONAL TO ABSOLUTE TEMPERATURE, WITH LOW POWER SUPPLY VOLTAGE AND LARGE POWER SUPPLY REJECTION RATE

(75) Inventors: Jimmy Fort, Puyloubier (FR); Thierry Soude, Marseilles (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 13/472,706

(22) Filed: May 16, 2012

(65) Prior Publication Data

US 2012/0293239 A1 Nov. 22, 2012

(30) Foreign Application Priority Data

May 17, 2011 (FR) ..................................... 11 54267

(51) Int. Cl.
*G06F 1/10* (2006.01)
*G05F 3/02* (2006.01)

(52) U.S. Cl.
USPC .......................................... 327/539; 327/512

(58) Field of Classification Search
USPC .................. 327/512, 513, 539; 323/313, 316
See application file for complete search history.

(56) References Cited

U.S. PATENT DOCUMENTS

2006/0261882 A1* 11/2006 Johnson ........................ 327/539
2010/0164608 A1* 7/2010 Shin ............................. 327/539
2012/0293143 A1* 11/2012 Fort et al. ..................... 323/265

OTHER PUBLICATIONS

Banba, H. et al., "A CMOS Bandgap Reference Circuit with Sub-1-V Operation," IEEE Journal of Solid-State Circuits, vol. 34, No. 5, May 1999, 5 pp.
Isikhan, T. et al., "A New Low Voltage Bandgap Reference Technology," IEEE 2009, pp. 183-186.
Lam, Y. et al., "CMOS Bandgap References with Self-Biased Symmetrically Matched Current-Voltage Mirror and Extension of Sub-1-V Design," IEEE Transactions on Very Large Scale Integration (VLSB Systems) vol. 18, No. 6, Jun. 2010, pp. 857-865.
Gray, P., "Analysis and Design of Analog Integrated Circuits," Fifth Edition, International Student Version, Feb. 15, 2001, 9 pp.

* cited by examiner

*Primary Examiner* — Quan Tra
(74) *Attorney, Agent, or Firm* — Slater & Matsil, L.L.P.

(57) ABSTRACT

The device for generating a reference current proportional to absolute temperature comprises processing means connected to the terminals of a core and designed to equalize the voltages across the terminals of the core, the core being designed to then be traversed by an internal current proportional to absolute temperature, and an output module designed to deliver to an output terminal the said reference current on the basis of the said internal current; the processing means comprise a self-biased amplifier possessing at least one first stage arranged according to a folded setup and comprising first PMOS transistors arranged in a setup of the common-gate type, and a feedback stage whose input is connected to the output of the amplifier and whose output is connected to the input of the first stage as well as to at least one terminal of the core.

29 Claims, 5 Drawing Sheets

DEVICE FOR GENERATING A REFERENCE CURRENT PROPORTIONAL TO ABSOLUTE TEMPERATURE, WITH LOW POWER SUPPLY VOLTAGE AND LARGE POWER SUPPLY REJECTION RATE

CROSS-REFERENCE TO RELATED APPLICATIONS

This application claims the priority benefit of French Patent Application No. 1154267, filed May 17, 2011, entitled "LOW VOLTAGE PTAT CURRENT REFERENCE WITH HIGH SUPPLY REJECTION," which is hereby incorporated by reference to the maximum extent allowable by law.

TECHNICAL FIELD

The invention relates to the generation of a current proportional to absolute temperature, generally known by the person skilled in the art by the name "PTAT current", where the acronym PTAT stands for: "Proportional To Absolute Temperature".

BACKGROUND

PTAT current generators may be used in particular but not exclusively in temperature sensors or else to generate a bandgap voltage reference.

A conventional solution for producing a device for generating a reference current proportional to absolute temperature (PTAT current) envisages the use of means connected to the terminals of a core, comprising for example a resistor and two bipolar transistors of different sizes mounted as diodes (or else in the two branches of the core two different numbers of bipolar transistors of the same size mounted as diodes), these means being designed to equalize the voltages across the terminals of the core, the latter then being traversed by an internal current proportional to absolute temperature.

An output module delivers to an output terminal the PTAT reference current on the basis of the internal current.

An important parameter of a PTAT current generator is the power supply voltage rejection rate, known by the person skilled in the art by the acronym PSRR ("Power Supply Rejection Ratio").

More precisely, when the power supply voltage of the generator varies, it results in a variation in the PTAT current delivered as output. The PSRR parameter is the ratio of the variation of the power supply voltage to the corresponding variation of the PTAT output current.

In prior art devices, obtaining good power supply voltage rejection, that is to say a high PSRR parameter, requires using a high power supply voltage.

SUMMARY OF THE INVENTION

In one aspect, the present invention provides for a device for generating a reference current proportional to absolute temperature. The device may include processing means connected to the terminals of a core and designed to equalize the voltages across respective terminals of the core, the core being configured to then be traversed by an internal current proportional to absolute temperature. The device may further include an output module configured to deliver to an output terminal the reference current on the basis of the internal current. The processing means may comprise a self-biased amplifier possessing at least one first stage arranged according to a folded setup and having first PMOS transistors arranged in a setup of the common-gate type, and a feedback stage having an input connected to an output of the amplifier and having an output connected to an input of the first stage and to at least one terminal of the core.

BRIEF DESCRIPTION OF THE DRAWINGS

Other advantages and characteristics of the invention, making it possible in particular to improve the stability of the output signal while increasing the gain of the amplifier, will be apparent on examining the detailed description of wholly non-limiting embodiments and the appended drawings in which.

DETAILED DESCRIPTION OF ILLUSTRATIVE EMBODIMENTS

Figure 1:
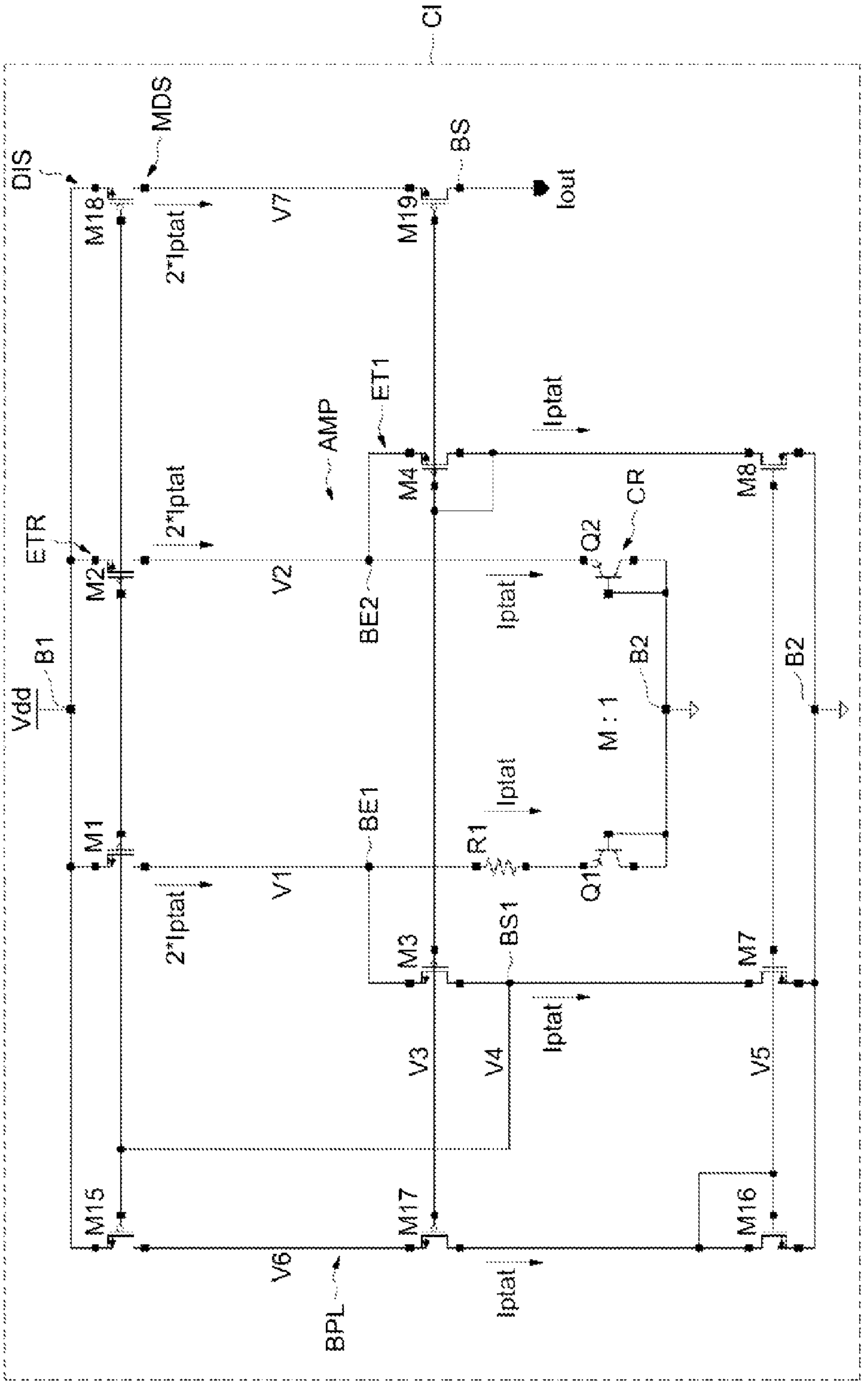
FIGS. 1 to 5 schematically illustrate various embodiments of a generating device according to the invention.

Before addressing the illustrated embodiments in detail, various embodiments and advantageous features thereof will be addressed generally in the following paragraphs.

With evolving technological trends leading to the use of increasingly low power supply voltages, it is becoming particularly beneficial to be able to operate a PTAT current source under a low power supply voltage, for example around 1 volt, while having a large PSRR parameter.

According to one embodiment, there is consequently proposed a generator of a PTAT reference current capable of operating under a low power supply voltage while exhibiting a large PSRR parameter.

According to one aspect, there is consequently proposed a device for generating a reference current proportional to absolute temperature, comprising processing means connected to the terminals of a core and designed to equalize the voltages across the terminals of the core, the core being designed to then be traversed by an internal current proportional to absolute temperature, and an output module designed to deliver to an output terminal the said reference current on the basis of the said internal current.

Of course the person skilled in the art is aware that the character proportional to absolute temperature of the internal current flowing in the core and of the reference current delivered as output depends in particular on the proper equalization of the voltages across the terminals of the core, this equalization possibly being better or worse as a function in particular of the technological vagaries related to the method of manufacture of the components possibly leading to mismatches of transistors, for example, or else of internal offsets in voltages.

A current proportional to absolute temperature is therefore understood here as a current proportional or substantially proportional to absolute temperature, especially taking account of technological inaccuracies and/or of possible voltage offsets for example.

According to a general characteristic of this aspect, the processing means comprise a self-biased amplifier possessing at least one first stage arranged according to a folded setup and comprising first PMOS transistors arranged in a setup of the common-gate type, and a feedback stage whose input is connected to the output of the amplifier and whose output is connected to the input of the first stage as well as to at least one terminal of the core.

The common-gate setup (in which the input signal drives the source of a MOS transistor) which is distinguished from a common-source setup (in which the signal drives a gate of a MOS transistor) makes it possible to decrease the input impedance since a source instead of a gate is driven, thereby making it possible in particular to improve the PSRR parameter.

Moreover, a folded setup of the first stage of the amplifier, in which the branches containing the PMOS transistors are connected between the terminals of the core and a reference voltage, for example ground, is distinguished from a stacked setup in which the transistors of the first stage are stacked with the transistors of the feedback stage and the transistors of the core, and thus makes it possible to operate under a minimum power supply voltage equal to the sum of a drain-source voltage of a MOS transistor and of a diode voltage, i.e. about 0.9 volts.

Furthermore, the use of PMOS transistors mounted in common-gate fashion, which require for their operation a negative gate-source voltage Vgs, helps with being able to operate the device under the minimum voltage of the power supply mentioned hereinabove, which would not have been the case if the transistors mounted in common-gate fashion had been NMOS transistors since it would then have been necessary to have a positive voltage Vgs at least equal to 0.7 volts, which would de facto have led to a necessary increase in the power supply voltage.

Although various types of architectures are possible, in particular a feedback connected to a single terminal of the core, it is preferable that the amplifier be a differential-input single-output amplifier, and that the feedback stage be a single-input differential-output feedback stage. A differential-differential global architecture such as this makes it possible to have good equality between the currents flowing in the two transistors (diodes) of the core and therefore better linearity in relation to temperature of the current proportional to absolute temperature.

According to one embodiment, the first stage comprises at least one differential pair of branches connected between the two terminals of the core and a reference voltage, for example ground, and the feedback stage is designed to deliver to the input of the first stage an intermediate current proportional to absolute temperature; a bias loop is then furthermore connected between the input of the feedback stage and the first stage, and designed to cause the flow of a bias current in each differential pair of branches of the first stage, the intermediate current being the sum of the said internal current flowing in the core, and of each bias current flowing in each differential pair of branches.

Therefore the amplifier is thus self-biased.

The first stage comprises for example, within a differential pair of branches, a pair of NMOS bias transistors connected in series with a pair of first PMOS transistors, and the said bias loop comprises this pair of NMOS bias transistors.

Although it is possible to cause different bias currents (drawn from the intermediate current delivered by the feedback stage) to flow in each pair of differential branches of the first stage of the amplifier, provided that the intermediate current is the sum of the internal current flowing in the core and of each bias current flowing in each differential pair of branches, it is preferable, in particular for reasons of simplification of embodiment and of consumption, that the bias loop comprises first copying means, connected between the feedback stage and the said pair of NMOS bias transistors, these first copying means being configured to copy a fraction of the intermediate current, the said fraction of the intermediate current corresponding to each bias current flowing in each differential pair of branches.

The value of this fraction is, preferably, equal to 1/(n+1), where n denotes the number of differential pairs of branches of the first stage of the amplifier that are connected to the terminals of the core. Thus, with such an embodiment, the bias current flowing in each differential pair of branches is identical for all the differential pairs of branches and identical to the internal current flowing in the core.

The output module comprises for example second copying means connected between the feedback stage and the output terminal, and configured to deliver a copied current equal to the said intermediate current, or else a multiple or sub-multiple of the said intermediate current. The reference current proportional to absolute temperature that is delivered as output by the generator then has for example the value of the copied current.

According to another embodiment, the amplifier comprises an inverter stage arranged in a setup of the common-source type, connected between the output of the first stage and the input of the feedback stage, the output of the inverter stage then forming the output of the amplifier.

The addition of such an inverter stage makes it possible in particular to increase the span of possible values for the power supply voltage, and to further improve the PSRR parameter.

According to another embodiment, the first stage of the amplifier comprises:

- a first differential pair of branches connected between the two terminals of the core and a reference voltage, for example ground, this first differential pair of branches comprising a first pair of first PMOS transistors;
- a second differential pair of branches connected in a crossed manner between the two terminals of the core and the reference voltage, this second differential pair of branches comprising a second pair of first PMOS transistors;
- the two doublets of homologous transistors of the two pairs forming respectively two pseudo-current mirrors;
- and the drains of the two first PMOS transistors of the second differential pair are respectively connected to the gates of two NMOS transistors of identical size and traversed by one and the same current.

Such an embodiment makes it possible to minimize the voltage offset of the amplifier, thereby favouring the equalization of the voltages across the terminals of the core.

Turning now to the illustrated embodiments, in FIG. 1, the reference DIS designates a device for generating a reference current proportional to absolute temperature.

This device DIS is for example produced in a manner integrated within an integrated circuit CI.

The device DIS comprises a core CR designed so as, when the voltages V1 and V2 at its two terminals BE1 and BE2 are equalized, to be traversed by an internal current Iptat proportional to absolute temperature.

Here the core CR comprises a first PNP bipolar transistor, referenced Q1, mounted in diode fashion and connected in series with a resistor R1 between the input terminal BE1 and a terminal B2 linked to a reference voltage, here ground.

The core CR also comprises a PNP bipolar transistor referenced Q2, also mounted in diode fashion, and connected in series between the second terminal BE2 of the core and the terminal B2 linked to ground.

The size of the transistor Q1 and the size of the transistor Q2 are different, and are in a ratio M in such a way that the current density passing through the transistor Q1 is different from the current density passing through the transistor Q2. Of course it would also be possible to use a transistor Q2 and M transistors Q1 in parallel, all of the same size as that of the transistor Q2.

As is well known by the person skilled in the art, when the voltages V1 and V2 are equal or substantially equal, the internal current Iptat passing through the resistor R1 is then proportional to absolute temperature and equal to KTLog (M)/qR1, where K denotes Boltzmann's constant, T the absolute temperature, q the charge of an electron, and Log the Napierian logarithm function.

The device also comprises an amplifier AMP here possessing a first stage ET1 arranged in common-gate setup and in folded setup.

The amplifier AMP is fed back by a feedback stage ETR connected between the output BS1 of the first stage ET1, and therefore of the amplifier AMP, and the differential input BE1, BE2 of the first stage which also forms the two terminals of the core CR.

The fed-back amplifier is thus designed to equalize the voltages V1, V2 across the terminals BE1, BE2 of the core CR.

The first stage ET1 of the amplifier AMP, which here is a stage with differential input and single output, here comprises a differential pair of branches comprising a pair of PMOS transistors M3, M4 mutually connected by their gate.

These two PMOS transistors are in common-gate setup, their respective sources, receiving the input signal, being connected to the two input terminals BE1, BE2.

The transistor M4 is mounted in diode fashion, its drain being linked to its gate.

The voltage across the terminals of the gates of the transistors M3 and M4 is fixed in differential and is for example of the order of 100 millivolts.

The voltage Vgs across the terminals of the transistors M3 and M4 is consequently negative and compatible with the operation of a PMOS transistor.

The drain of the transistor M3 here forms the output terminal BS1 of the first stage ET1.

The first stage ET1 also comprises two NMOS bias transistors, M7 and M8, mutually connected by their gate. The transistor M7 is connected in series between the drain of the transistor M3 and the terminal B2 linked to ground, and the transistor M8 is connected in series between the drain of the transistor M4 and the terminal B2.

The feedback stage ETR, arranged in common-source setup, comprises a pair of second PMOS transistors, M1, M2, mutually connected by their gate. The second PMOS transistor M1 has its source connected to the terminal B1 linked to a power supply voltage Vdd, and its drain connected to the terminal BE1.

The second PMOS transistor M2 also has its source connected to the power supply terminal B1 and its drain connected to the terminal BE2 of the core.

The voltage output terminal BS1 of the stage ET1 is connected to the input (gate of the transistors M1 and M2) of the stage ETR.

The feedback stage is therefore here a single-input differential-output stage, thereby making it possible to obtain a completely differential global architecture.

The device DIS also comprises a bias loop BPL connected between the input of the feedback stage and the first stage ET1.

This bias loop BPL here comprises first current-copying means comprising the PMOS transistors M1 and M2 of the feedback stage, as well as a first supplementary PMOS transistor M15 whose gate is connected to the gate of the transistors M1 and M2 and whose source is connected to the power supply terminal B1. The size (channel width W/channel length L) of the transistor M1 (which is equal to the size of the transistor M2) is here twice as large as the size of the transistor M15 so that the first copying means M1, M2, M15 deliver a copied current equal to half the current, called the intermediate current, delivered by the feedback stage ETR to the first stage ET1, and flowing in the transistors M1, M2.

In addition to a transistor M17, the function of which will be returned to in greater detail hereinafter, the bias loop also comprises a current mirror formed by the two bias transistors M7, M8 and by a transistor M16 mounted in diode fashion and connected in series between the transistor M17 and the terminal B2 linked to ground.

On account of the presence of this bias loop BPL, the amplifier AMP is here self-biased.

The device DIS also comprises an output module MDS here comprising second current-copying means formed by the PMOS transistors M1, M2 of the feedback stage, and by a second PMOS supplementary transistor, referenced M18.

The gate of this transistor M18 is connected to the gate of the transistors M1, M2 and its source is linked to the power supply terminal B1. Its drain is linked to the output terminal BS of the device by way of a transistor M19, the function of which will be returned to in greater detail hereinafter.

Although the ratio of the size of the transistor M18 to the size of the transistors M1, M2 may be arbitrary, the size of the transistor M18 is here taken equal to the size of the transistor M2 (equal to the size of the transistor M1) in such a way that the second copying means M1, M2, M18 deliver a copied current equal to the intermediate current delivered by the feedback stage.

Although not indispensable, the auxiliary transistors M17 and M19, whose gates are connected to the gates of the transistors M3 and M4 of the first stage ET1 of the amplifier, form respectively with the transistors M15 and M18 two cascode setups. These cascode setups make it possible to ensure equality between the voltages V2 and V7 on the one hand, and V1 and V6 on the other hand. The cascode transistors significantly improve the PSRR parameter.

In the steady state, that is to say when the voltages V1 and V2 are equalized or almost equalized, the core CR is traversed by the internal current Iptat while the intermediate current delivered by the feedback stage ETR, and passing through the PMOS transistors M1 and M2, is equal to twice the current Iptat.

Since the size of the transistor M15 is half the size of the transistor M1, the copied current flowing in the branch M15, M17 is equal to the internal current Iptat. Moreover, this current Iptat is also copied in the differential pair of branches M3, M7 and M4, M8 so as to bias the stage ET1 with a bias current equal to Iptat.

The intermediate current equal to twice Iptat is therefore indeed the sum of the internal current Iptat flowing in the core and of the bias current Iptat flowing in the differential pair of branches of the first stage of the amplifier AMP.

Because of the folded setup of the stage ET1 and of the use of PMOS transistors in this folded setup, the minimum power supply voltage Vdd allowing operation of the device DIS is equal to the sum of the drain-source voltage of the PMOS transistor M2 and of the base-emitter voltage of the transistor Q2, i.e. about 0.9 volts.

Moreover, due to the fact that the PMOS transistors of the stage ET1 of the amplifier are arranged in a common-gate setup, the impedance across the terminals BE1 and BE2 is significantly reduced, thereby making it possible to have a large PSRR parameter for example of the order of 60 dB in the steady state (under DC: "Direct Current").

The current Tout delivered at the output terminal BS of the device is a current proportional to absolute temperature and equal here, having regard to the equality of size between the transistors M2 and M18, to the intermediate current delivered by the feedback stage ETR, i.e. twice the current Iptat.

Figure 2:
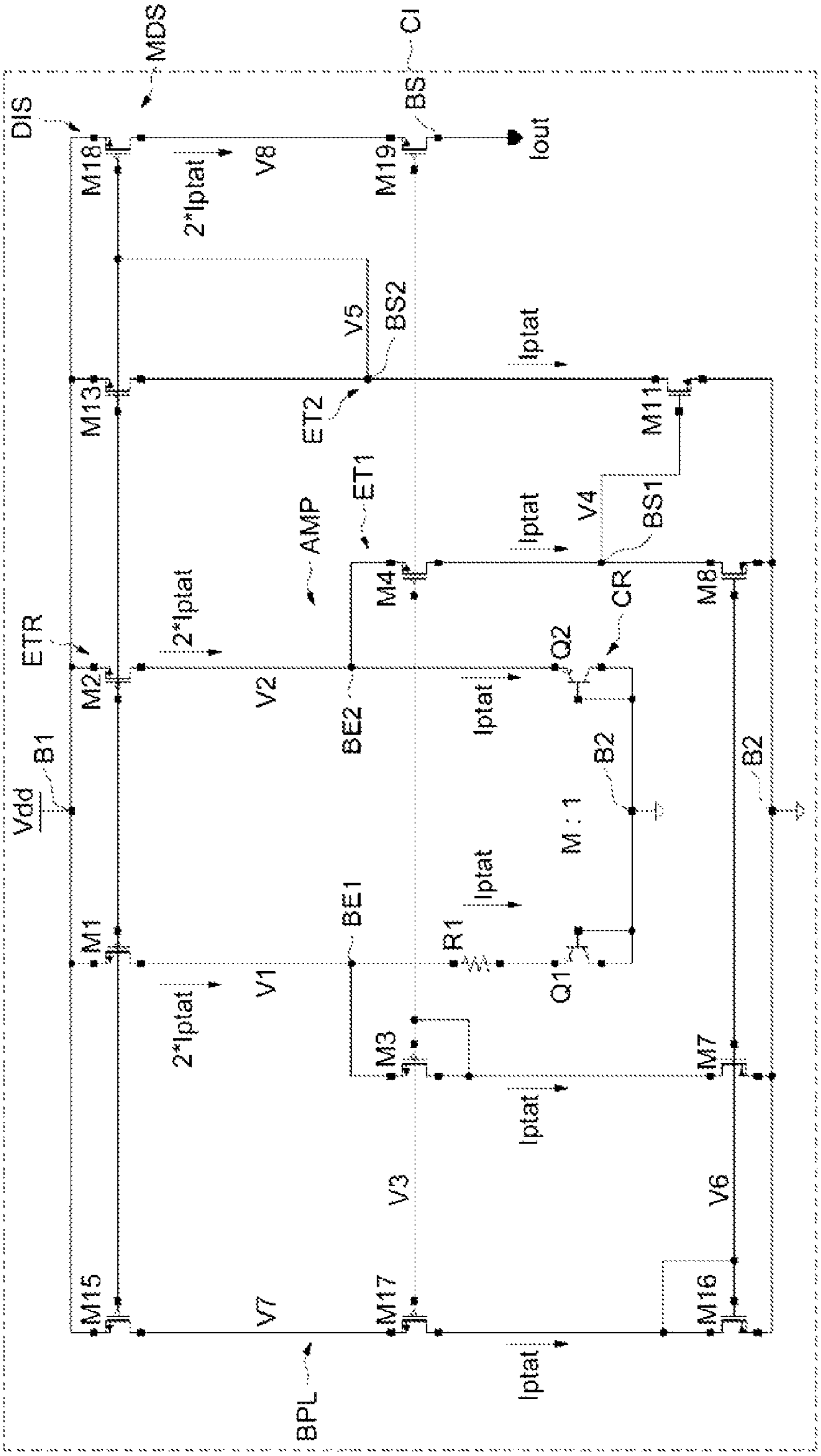

So as to increase the span of possible values for the power supply voltage Vdd, and to further increase the PSRR rate, it is possible to use the embodiment of the device DIS illustrated in FIG. 2.

Relative to the embodiment of FIG. 1, the amplifier AMP of the device DIS here comprises an inverter stage ET2 arranged in a setup of the common-source type (the output signal of the first stage drives the gate of a MOS transistor), this inverter stage being connected between the output BS1 of the first stage ET1 and the input of the feedback stage, the output BS2 of the inverter stage forming the output of the amplifier AMP.

In this embodiment, this time it is the first PMOS transistor M3 which is mounted in diode fashion, and the output BS1 of the first stage is formed by the drain of the first PMOS transistor M4.

The inverter stage ET2 here comprises a first NMOS transistor M11 as well as a PMOS transistor M13. The source of the NMOS transistor M11 is linked to the reference terminal B2 (ground) while the source of the PMOS transistor M13 is linked to the power supply terminal B1.

The drains of the transistors M11 and M13 are linked together and form the output BS2 of the inverter stage ET2. This output BS2 is linked to the gate of the transistors M1, M2, M13 in particular.

It is noted here moreover that the transistor M13 is mounted in diode fashion, thereby conferring a relatively low gain on the inverter stage ET2.

That said, the span of admissible values for the power supply voltage is higher than in the embodiment of FIG. 1, since the dynamic swing in the voltage V5 (terminal BS2) is greater than the dynamic swing of the voltage V4 (terminal BS1) of the device of FIG. 1 which follows the increase in the power supply voltage Vdd leading ultimately to pinch-off of the drain-source voltage of the transistor M3 of the device of FIG. 1.

Indeed, in the embodiment of FIG. 2, when the power supply voltage increases, the voltage V5 increases, but the voltage V4 remains fixed since this voltage drives the gate of an NMOS transistor (the transistor M11) referenced to ground.

By way of indication, whereas the span of possible variations of the power supply voltage Vdd is of the order of 300 millivolts for the device of FIG. 1, it extends between about 0.9 volts and the value of the breakdown voltage of the transistors for the device of FIG. 2.

Moreover, the presence of the second inverter stage ET2 in the device of FIG. 2 allows an increase in the open-loop gain (even if this increase is small given the small gain of the inverter stage), thereby tending in the direction of an improvement in the PSRR parameter.

That said, both the device of FIG. 1 and the device of FIG. 2 exhibit a variable voltage offset between the terminals BE1 and BE2 (on the voltages V1 and V2), because of the non-equality between the drain voltages V3 and V4 of the transistors M3 and M4, this voltage offset being moreover variable with temperature.

This may be an impediment in certain applications.

Figure 3:
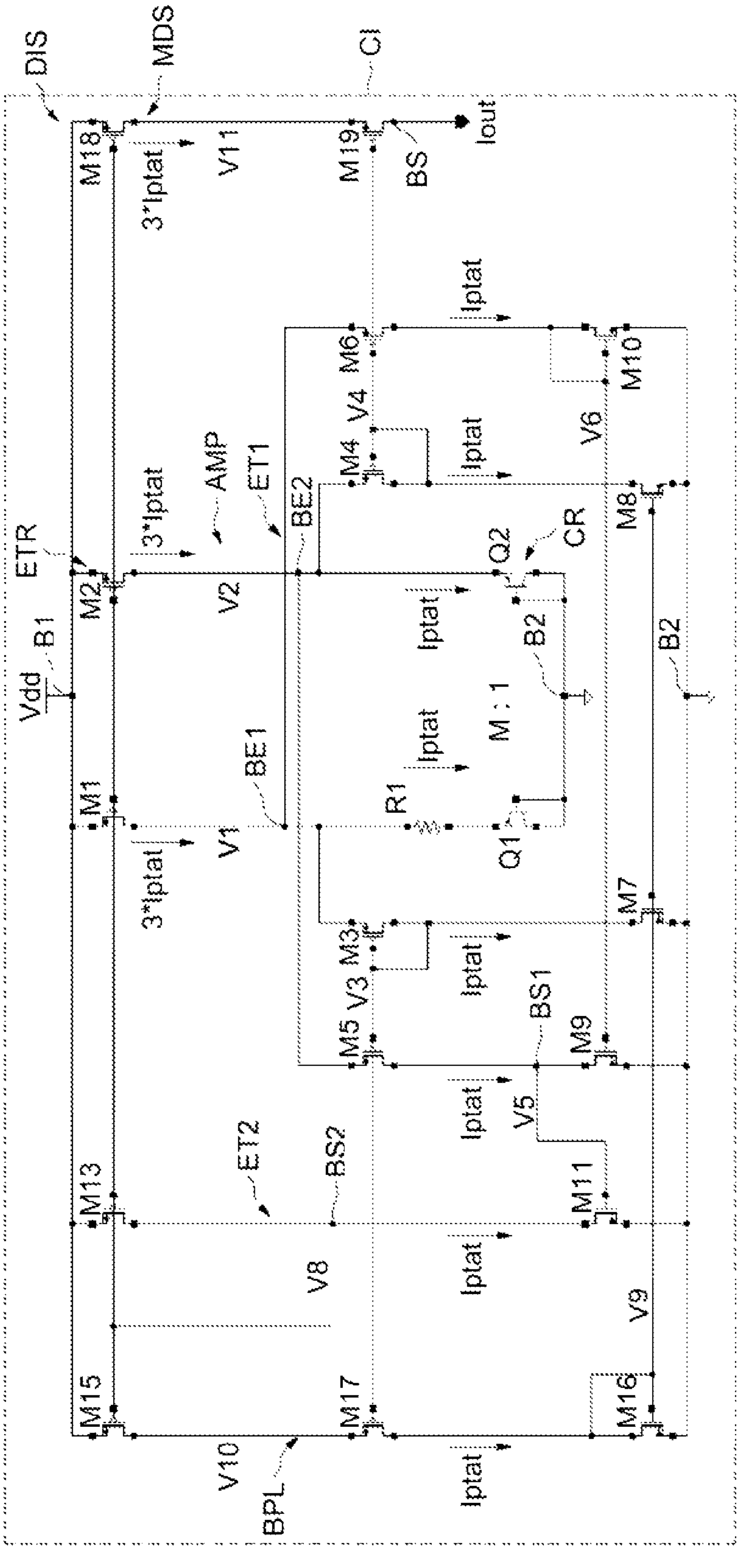

Hence, so as to reduce, or indeed remove, this offset on the voltages V1 and V2, and thus better equalize these voltages V1 and V2, it is for example possible to use the embodiment illustrated in FIG. 3.

Relative to the previous embodiments, the first stage ET1 of the amplifier AMP of the device DIS illustrated in FIG. 3 has a different structure, but still exhibiting a folded arrangement as a common-gate setup. More precisely, the first stage ET1 comprises a first differential pair of branches connected between the two terminals BE1 and BE2 of the core and the reference terminal B2 (ground), this first differential pair of branches comprising a first pair of first PMOS transistors M3 and M4.

The first stage ET1 moreover comprises a second differential pair of branches connected in a crossed manner between the two terminals BE1 and BE2 of the core, and the reference voltage (terminal B2), this second differential pair of branches comprising a second pair of first PMOS transistors M5 and M6.

The transistors M3 and M4 of the first pair of transistors are mounted in diode fashion, their respective drains being connected to their common gate.

Moreover, the gate of the transistor M5 is linked to the gate of the transistor M3 and the gate of the transistor M6 is linked to the gate of the transistor M4. The doublet of homologous transistors M3, M5 of the two pairs therefore forms a pseudo-current mirror, just like the doublet of the homologous transistors M4, M6 of the two pairs.

Each doublet forms a pseudo-current mirror since the sources of the two transistors of each doublet are different. This being so, the equality of the currents flowing in the two transistors of each doublet stems from the fact that the device equalizes the sources of the two corresponding transistors in the steady state, that is to say when the voltages V1 and V2 are equalized or almost equalized. A copied current is then obtained and each doublet of transistors then behaves functionally as a current mirror. Each doublet may therefore be said to form a pseudo-current mirror structurally and a current mirror functionally.

The first differential pair of branches includes the two NMOS bias transistors, referenced M7 and M8, respectively connected in series with the PMOS transistors M3 and M4.

The second differential pair of branches comprises a first supplementary NMOS transistor M9 and a second supplementary transistor M10, the latter being mounted in diode fashion, whose gates are mutually connected, and together forming a current mirror.

The drain of the first supplementary NMOS transistor referenced M9 is connected to the drain of the PMOS transistor M5 and its source is linked to ground (terminal B2).

Likewise, the drain of the supplementary NMOS transistor referenced M10 is connected to the drain of the transistor M6 and its source is linked to the terminal B2.

The size (ratio W/L where W denotes the width of the channel and L the length of the channel) of the supplementary NMOS transistor M10 is equal to the size of the first NMOS transistor M11 of the inverter stage ET2 whose gate is connected to the output BS1 of the stage ET1.

Here again, the stage ET1 is, in this embodiment, a differential-input single-output stage while the inverter stage ET2 is, just like in the embodiment of FIG. 2, a single-input single-output stage.

In the embodiment of FIG. 3, the size of the transistor M1 of the feedback stage ETR is three times as large as the size of the transistor M15 of the first copying means.

Likewise, the size of the PMOS transistor M13 of the inverter stage ET2 is identical to the size of the transistor M15.

During operation, the intermediate current delivered by the feedback stage ETR and passing through the PMOS transistors M1 and M2 is now equal to three times the current Iptat.

The bias loop BPL makes it possible to cause a bias current equal to Iptat to flow in the first differential pair of branches comprising the bias transistors M7 and M8.

The pseudo-current mirrors M3, M5, and M4, M6 also make it possible to cause a bias current equal to Iptat to flow in the branches of the second differential pair of branches of the first stage ET1.

Finally, the current mirror M15, M13 makes it possible to cause a current also equal to Iptat to flow in the branch M13, M11 of the stage ET2.

It is therefore noted that the voltage V5 (drain of the transistor M5) drives the gate of an NMOS transistor, in this instance the transistor M11 of the stage ET2, while the voltage V6 (drain of the transistor M6) also drives the gate of an NMOS transistor, in this instance the transistor M10 of the current mirror M9, M10.

And, since the size of the transistors M11 and M10 is identical and these two transistors are traversed by the same current, namely the current Iptat, there is equality of the voltages V5 and V6 and consequently an absence of offset at the level of the voltages V1 and V2.

It should be noted here that the current mirror M9, M10 makes it possible to recover the differential and actually allows a single output for the first stage ET1.

Moreover, this embodiment makes it possible to further increase the PSRR parameter because of the crossed coupling of the differential pairs of branches containing the transistors M3, M5, M4, M6 which allow an increase by two in the gain.

That said, because of the presence in the embodiment of FIG. 3 of two gain stages, namely a first gain stage provided by the transistors M5, M9 of the first stage ET1 and a second gain stage provided by the inverter stage ET2 (even if this second gain is small since the transistor M13 is mounted in diode fashion), stability problems may result with the output signal, giving rise to the presence in this signal of sustained oscillations.

It may therefore be necessary, in certain applications, to compensate for these oscillations for example through the addition of capacitors.

Figure 4:
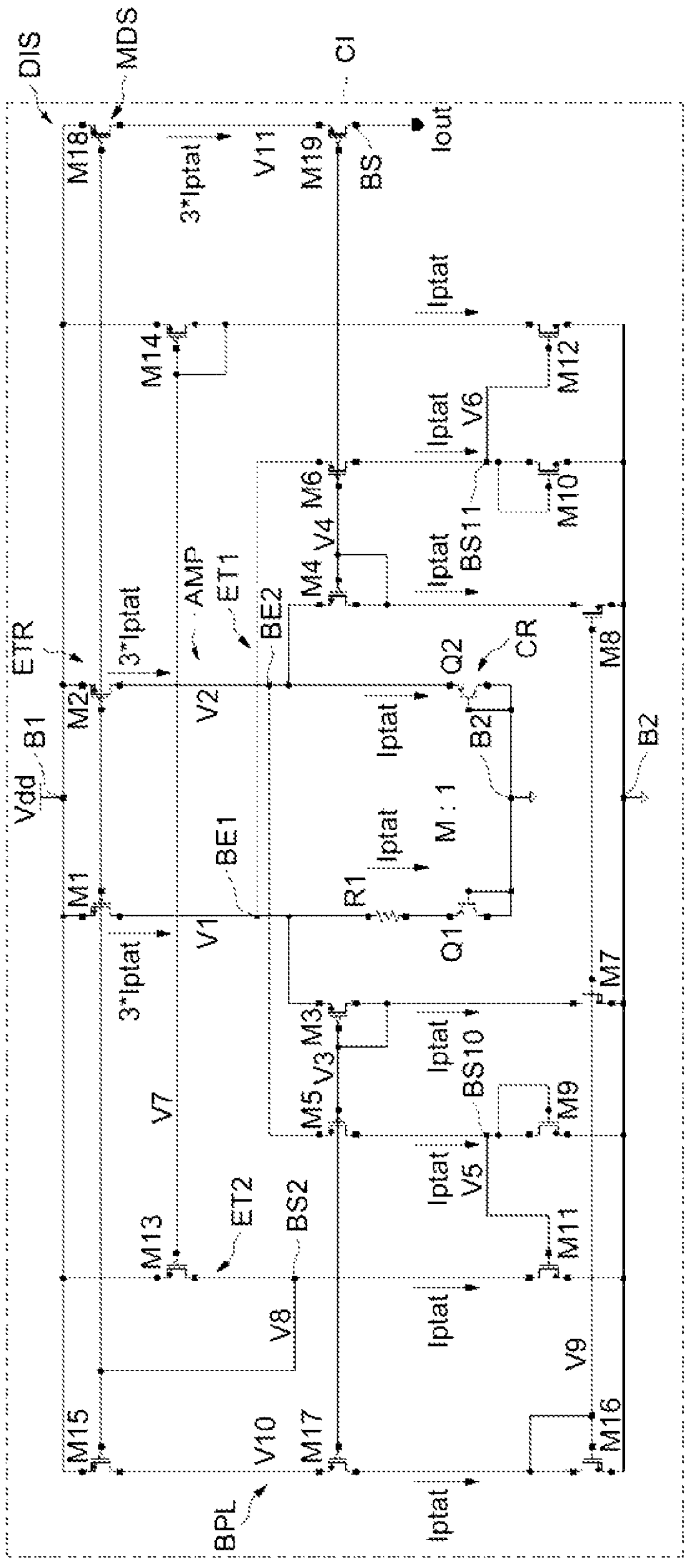

That said, the embodiment of FIG. 4 makes it possible to offer a reduction in or indeed the elimination of the offset between the voltages V1 and V2 while making it possible, in certain applications, to circumvent compensation by addition of capacitors.

More precisely, with respect to the embodiment of FIG. 3, this time the first amplifier AMP stage ET1 of the device of FIG. 4 comprises, in its second differential pair of branches, not only the second supplementary NMOS transistor M10 mounted in diode fashion, but also the first supplementary NMOS transistor M9 mounted in diode fashion. The first supplementary NMOS transistor M9, mounted in diode fashion, forms with the NMOS transistor M11 of the inverter stage ET2, whose gate is linked to the drain of the transistor M9, a current mirror.

Moreover, in this embodiment, the inverter stage ET2 comprises a second branch comprising a second NMOS transistor M12 and a second PMOS transistor M14 mounted in diode fashion, connected in series between the power supply terminal B1 and the second NMOS transistor M12 referenced moreover to ground (connection of the source to the terminal B2).

The gate of the PMOS transistor M14 is moreover linked to the gate of the PMOS transistor M13 of the stage ET2, these two transistors M13 and M14 thus forming a current mirror.

By analogy with the transistors M9 and M11, the transistors M10 and M12 form an NMOS current mirror, the gate of the transistor M12 being linked to the drain of the transistor M10.

It will also be noted here that this time the stage ET1 is a differential-input differential-output stage, the differential output BS10-BS11 of the first stage ET1 being formed by the drains of the transistors M5 and M6.

Therefore, this time the inverter stage ET2 is a differential-input single-output stage.

Moreover, it will be noted here that the gain of the inverter stage ET2 is much greater than the gain of the stage ET2 of the previous embodiments since this time the transistor M13 is not mounted in diode fashion.

During operation, the intermediate current delivered by the feedback stage ETR and flowing through the transistors M1 and M2 is once again equal to three times the current Iptat flowing in the core CR.

This same current Iptat flows in the first differential pair of branches by virtue of the bias loop BPL comprising the NMOS bias transistors M7 and M8.

The pseudo-current mirrors M3, M5 on the one hand, and M4, M6 on the other hand, also allow flow of the current Iptat in the second differential pair of branches.

The current mirrors M9, M11 on the one hand and the current mirrors M10, M12 on the other hand allow, for their part, flow of the current Iptat in the two branches M11, M13 and M12, M14 of the inverter stage ET2.

As in the previous embodiment, there is a considerable reduction or indeed removal of the voltage offset at the level of the voltages V1 and V2 because of the equality of the voltages V5 and V6 but also of the voltages V7 and V8. Indeed, these two voltages V5 and V6 drive respectively two NMOS transistors of identical size, M9 and M10, mounted in diode fashion, traversed by one and the same current Iptat. Moreover, the voltages V7 and V8 are equal since they drive the gates of transistors of the same size M13, M14, M15, traversed by the same current Iptat.

Moreover, this time the current mirror M13, M14 makes it possible to recover the differential at the level of the inverter stage ET2 which is a stage with single output BS2.

Furthermore, the stability of the output signal of the device of FIG. 4 is much greater and it is therefore possible to circumvent compensation. Indeed, even if the transistors M5 and M9 and also M6 and M10 form a gain stage, this gain is tiny given the fact that the transistors M9 and M10 are mounted in diode fashion. Consequently, here the structure of FIG. 4 may be considered to comprise essentially a single gain stage, namely that provided by the transistors M13 and M11 as well as M12 and M14 of the stage ET2, thereby favouring the stability of the output signal. Indeed the high-impedance node BS2 (voltage V8) is situated just where the capacitive value is the highest so as to form a first low-frequency pole which favours stability.

The embodiment of FIG. 5 makes it possible, as will be seen in greater detail hereinafter, to increase the gain of the structure as well as the PSRR parameter while continuing to offer a greater span of values for the power supply voltage, and a reduction or indeed a decrease in the offset between the voltages V1 and V2.

Figure 5:
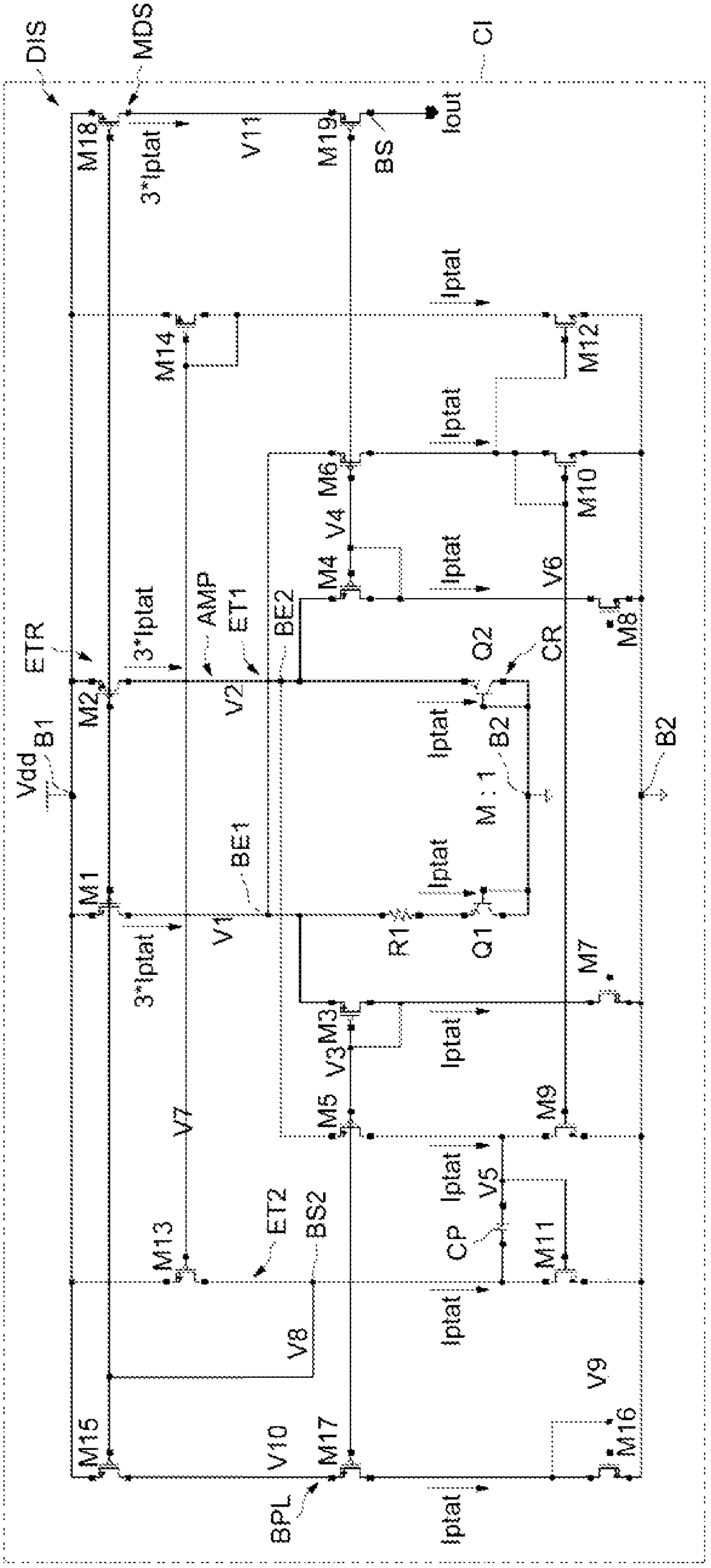

In this regard, the device DIS of FIG. 5 comprises an amplifier AMP whose first stage ET1 has a structure identical to that of the first stage ET1 of the amplifier of FIG. 3, and whose stage ET2 has the same structure as that of the stage ET2 of the amplifier of FIG. 4.

Consequently, relative to the structure of FIG. 4, the gain is greatly increased since here two gain stages are present, namely that produced by the transistors M3 to M10 of the stage ET1, and by the transistors M11, M12, M13 and M14 of the stage ET2.

On account of the increase in the gain, the PSRR parameter is increased.

Moreover, in a manner analogous to what was explained hereinabove, the span of admissible values for the power supply voltage is considerable because of the considerable dynamic swing of the voltage V5 while the voltage V4 remains fixed when the power supply voltage varies.

Moreover, as was explained hereinabove, here there is still a considerable reduction or indeed removal of the voltage offset between the voltages V1 and V2 because of the equality of the voltages V5 and V6, both of which drive MOS transistors of identical size traversed by one and the same current, namely the current Iptat, and of the equality of the voltages V7 and V8 since, as indicated previously, they drive the gates of transistors of the same size traversed by the same current.

By way of indication, the value of the gain of such a structure is of the order of 80 dB with a PSRR parameter of the order of 120 dB in the steady state (under DC: "Direct Current").

The power supply voltage can vary between about 0.9 volts and the value of the breakdown voltage of the transistors.

On the other hand, in certain applications such a structure may require compensation because of the presence of the two gain stages. This compensation may be carried out between the voltages V8 and V5 or else between the power supply voltage Vdd and the voltage V8. That said, the compensation may be readily carried out by placing for example a capacitor CP between the voltage V5 and V8, that is to say between the drain of the transistor M5 and the drain of the transistor M11, and in this regard the Miller is of benefit, the latter making it possible to have an effective capacitance between the voltage V5 and ground equal to the product of the capacitive value of the capacitor CP and the gain of the stage ET2.

What is claimed is:

1. A device for generating a reference current proportional to absolute temperature, comprising:
- a processing circuit connected to the terminals of a core and designed to equalize the voltages across respective terminals of the core, the core being configured to then be traversed by an internal current proportional to absolute temperature; and
- an output module configured to deliver to an output terminal the reference current on the basis of the internal current; and
- wherein the processing circuit comprises a self-biased amplifier possessing at least one first stage arranged according to a folded setup and having
  - first PMOS transistors arranged in a setup of the common-gate type, and
  - a feedback stage having an input connected to an output of the amplifier and having an output connected to an input of the first stage and to at least one terminal of the core, wherein
    - the first stage comprises at least one differential pair of branches connected between the two terminals of the core and a reference voltage;
    - the feedback stage is designed to deliver as input to the first stage an intermediate current proportional to absolute temperature; and
    - a bias loop is furthermore connected between the input of the feedback stage and the first stage, and is configured to cause the flow of a bias current in each differential pair of branches, the intermediate current being the sum of the internal current and of each bias current flowing in each differential pair of branches.

2. The device according to claim 1, wherein the first stage comprises within a differential pair of branches, a pair of NMOS bias transistors connected in series with a pair of first PMOS transistors, the bias loop comprising this pair of NMOS bias transistors.

3. The device according to claim 2, wherein the bias loop comprises a first copying circuit connected between the feedback stage and the pair of NMOS bias transistors, and configured to copy a fraction of the intermediate current, the fraction of the intermediate current corresponding to each bias current flowing in each differential pair of branches.

4. The device according to claim 3, wherein the feedback stage comprises a pair of second PMOS transistors mutually connected by their gate, respective sources of the second transistors being connected to a power supply terminal, drains of the second PMOS transistors being respectively linked to the two terminals of the core, and wherein
- the first copying circuit comprises the second PMOS transistors and a first supplementary PMOS transistor mutually connected by their gate, the ratio of the size of the first supplementary PMOS transistor to the size of the two second PMOS transistors being equal to the value of the fraction.

5. The device according to claim 4, wherein the output module comprises a second copying circuit connected between the feedback stage and the output terminal and configured to deliver a copied current equal to the intermediate current or a multiple or sub-multiple of the said intermediate current, the reference current having the value of the copied current, the second copying circuit comprising the two PMOS transistors of the feedback stage and a second supplementary PMOS transistor mutually connected by their gate, the ratio of the size of the second supplementary PMOS transistor to the size of the two second PMOS transistors defining the ratio of the value of the copied current to the value of the said intermediate current.

6. The device according to claim 5, further comprising a first auxiliary transistor forming, with the first supplementary transistor of the first copying circuit, a first cascode setup and a second auxiliary transistor forming, with the second supplementary transistor of the second copying circuit, a second cascode setup.

7. The device according claim 2, wherein the amplifier comprises an inverter stage arranged in a setup of the common-source type, and connected between the output of the first stage and the input of the feedback stage, the output of the inverter stage forming the output of the amplifier.

8. The device according to claim 7, wherein the first stage of the amplifier comprises a first differential pair of branches connected between the two core terminals and a reference voltage and comprising a first pair of first PMOS transistors, and a second differential pair of branches connected in a crossed manner between the two terminals of the core and the reference voltage and comprising a second pair of first PMOS transistors the two homologous doublets of transistors of the two pairs forming respectively two pseudo-current minors, and the drains of the two first PMOS transistors of the second differential pair are respectively connected to the gates of two NMOS transistors of the same size and intended to be traversed by one and the same current.

9. The device according to claim 8, wherein the two first PMOS transistors of the first differential pair are mounted in diode fashion and the drains of these two first PMOS transistors are respectively connected to the reference voltage by way of the two NMOS bias transistors, the drain of one of the two first PMOS transistors of the second differential pair is on the one hand connected to the gate of a first NMOS transistor of the inverter stage and on the other hand to the reference voltage by way of a first supplementary NMOS transistor, and the drain of the other of the two first PMOS transistors of the second differential pair is connected to the reference voltage by way of a second NMOS supplementary transistor mounted in diode fashion.

10. The device according to claim 9, wherein the first supplementary NMOS transistor and the second supplementary NMOS transistor which is mounted in diode fashion, are mutually arranged in current-mirror fashion.

11. The device according to claim 9, wherein the inverter stage comprises a first branch comprising the first NMOS transistor and a first PMOS transistor connected in series between the first NMOS transistor and a power supply terminal, and a second branch comprising a second NMOS transistor and a second PMOS transistor, mounted in diode fashion, connected in series between the power supply terminal and the second NMOS transistor, the first PMOS transistor and the second PMOS transistor being mutually arranged in current-mirror fashion, the first supplementary NMOS transistor is mounted in diode fashion and forms with the first NMOS transistor of the inverter stage a first current mirror, and the drain of the other of the two first PMOS transistors of the second differential pair is also connected to the gate of the second NMOS transistor of the second branch of the inverter stage.

12. The device according to claim 10, wherein the inverter stage comprises a first branch comprising the first NMOS transistor and a first PMOS transistor connected in series between the first NMOS transistor and a power supply terminal and a second branch comprising a second NMOS transistor and a second PMOS transistor, mounted in diode fashion, connected in series between the power supply terminal and the second NMOS transistor, the first PMOS transistor and the second PMOS transistor being mutually arranged in current-mirror fashion, the drain of the other of the two first PMOS transistors of the second differential pair is also connected to the gate of the second NMOS transistor of the second branch of the inverter stage.

13. An integrated circuit comprising:

a core circuit having a first branch with a current path coupled between a first input terminal and a ground terminal and having a second branch with a current path coupled between a second input terminal and the ground terminal, the core circuit configured to pass therethrough a current proportional to absolute temperature when a voltage on the first input terminal and a voltage on the second input terminal are equalized;

a first stage of an amplifier circuit having a first branch with a current path coupled between the first input terminal and the ground terminal and having a second branch with a current path coupled between the second input terminal and the ground terminal, and having an output terminal;

a feedback circuit having an input coupled to the output terminal of the first stage, and having a first output coupled to the first input terminal of the core circuit and a second output coupled to the second input terminal of the core circuit; and a bias loop circuit configured to self-bias the first stage of an amplifier circuit.

14. The integrated circuit of claim 13 wherein the first branch of the core circuit comprises a first transistor coupled in series with a first resistor and the second branch of the core circuit comprises a second diode-connected transistor.

15. An integrated circuit comprising:

a core circuit having a first branch coupled between a first input terminal and a ground terminal and having a second branch coupled between a second input terminal and the ground terminal, the core circuit configured to pass therethrough a current proportional to absolute temperature when a voltage on the first input terminal and a voltage on the second input terminal are equalized;

a first stage of an amplifier circuit having a first branch connected in parallel with the first branch of the core circuit and having a second branch connected in parallel with the second branch of the core circuit, and having an output terminal;

a feedback circuit having an input coupled to the output terminal of the first stage, and having a first output coupled to the first input terminal of the core circuit and a second output coupled to the second input terminal of the core circuit; and a bias loop circuit configured to self-bias the first stage of an amplifier circuit, wherein the first branch of the first stage of the amplifier circuit comprises a first transistor having a drain coupled to the first input terminal of the core circuit, coupled in series with a second transistor and wherein the second branch of the first stage of the amplifier circuit comprises a third transistor having a drain coupled to the second input terminal of the core circuit, coupled in series with a fourth transistor, and wherein the first transistor has a common gate with the third transistor.

16. The integrated circuit of claim 13, further comprising a second stage of the amplifier circuit.

17. The integrated circuit of claim 13 wherein the amplifier circuit is a differential-input single-output amplifier, and the feedback circuit is a single-input differential-output circuit.

18. The integrated circuit of claim 13 wherein the first stage of the amplifier circuit, the feedback circuit, and the bias loop circuit operate to drive the voltage at the first input terminal of the core circuit and the voltage of the second input terminal of the core circuit to be substantially equal.

19. A device for generating a reference current proportional to absolute temperature, comprising:

a processing circuit coupled to terminals of a core and designed to equalize voltages across respective terminals of the core, the core being configured to then be traversed by an internal current proportional to absolute temperature, wherein the processing circuit comprises a self-biased amplifier, the self-biased amplifier comprising:

a first stage arranged according to a folded setup, the first stage comprising first PMOS transistors coupled to the terminals of the core and arranged in a setup of the common-gate type, and a feedback stage having an input coupled to an output of the self-biased amplifier and having an output coupled to an input of the first stage and to at least one terminal of the core; and an output module configured to deliver to an output terminal the reference current on the basis of the internal current.

20. The device according to claim 19, wherein the amplifier is a differential-input single-output amplifier and the feedback stage is a single-input differential-output feedback stage.

21. The device according to claim 19, wherein:

the first stage comprises at least one differential pair of branches connected between the two terminals of the core and a reference voltage;

the feedback stage is designed to deliver as input to the first stage an intermediate current proportional to absolute temperature; and a bias loop is furthermore connected between the input of the feedback stage and the first stage, and is configured to cause the flow of a bias current in each differential pair of branches, the intermediate current being the sum of the internal current and of each bias current flowing in each differential pair of branches.

22. A circuit comprising:

a core comprising a first terminal and a second terminal and configured to generate a current proportional to absolute temperature when the voltages across the first and second terminals of the core are equalized;

a first stage comprising a first PMOS transistor coupled to the first terminal and a second PMOS transistor coupled to the second terminal;

a feedback stage comprising a first transistor coupled to the first terminal and having a first input gate and a second transistor coupled to the second terminal and having a second input gate, wherein an output of the first stage is coupled to the first and second input gates; and an output module configured to output a current proportional to the current generated in the core.

23. The circuit of claim 22 wherein the core further comprises:

a first branch coupled to the first terminal and having a first transistor coupled in series with a first resistor, and a second branch coupled to the second terminal and having a diode-connected second transistor.

24. The circuit of claim 22, further comprising a bias loop coupled to the first stage and the feedback stage, and configured to cause the flow of a bias current in the first stage and the feedback stage.

25. The circuit of claim 24, wherein the first stage further comprises a first NMOS transistor coupled in series with the first PMOS transistor and a second NMOS transistor coupled in series with the second PMOS transistor, and wherein input gates of the first and second NMOS transistors are coupled to the bias loop.

26. The circuit of claim 22, wherein the output module comprises a first output transistor coupled in series with a second output transistor between a supply voltage and an output terminal of the output module, wherein the first transistor has an input gate coupled to the output of the first stage and the second transistor has an input gate coupled to input gates of the first and second PMOS transistors.

27. A circuit comprising:

a first bipolar junction transistor (BJT) coupled between a first internal terminal and a first reference node;

a second BJT coupled between a second internal terminal and the first reference node;

a resistor coupled between the first internal terminal and the first BJT;

a first transistor having a conduction path coupled between the first internal terminal and a supply voltage node;

a second transistor having a conduction path coupled between the second internal terminal and the supply voltage node;

a first P-type MOS transistor having a conduction path coupled between the first internal terminal and gates of the first and second transistors; and a second P-type MOS transistor being diode connected and having a conduction path coupled to the second internal terminal.

28. The circuit of claim 27, further comprising:

a first bias loop transistor having a conduction path coupled between the gates of the first and second transistors and a second reference node;

a second bias loop transistor having a conduction path coupled between a conduction terminal of the second P-type MOS transistor and the second reference node;

a third bias loop transistor having a conduction path coupled to the second reference node and an intermediate node, a gate coupled to gates of the first and second bias loop transistors, and a coupling between the intermediate node and the gate of the third bias loop transistor;

a fourth bias loop transistor having a conduction path coupled in series with the conduction path of the third bias loop transistor; and a fifth bias loop transistor having a conduction path coupled to the supply voltage node and in series with the conduction path of the fourth bias loop transistor.

29. The circuit of claim 27, further comprising:

a first output transistor having a conduction path coupled to the supply voltage node and a gate coupled to the gates of the first and second transistors; and a second output transistor having a conduction path coupled to an output terminal and in series with the conduction path of the first output transistor.

* * * * *

UNITED STATES PATENT AND TRADEMARK OFFICE

CERTIFICATE OF CORRECTION

PATENT NO. : 8,653,885 B2
APPLICATION NO. : 13/472706
DATED : February 18, 2014
INVENTOR(S) : Jimmy Fort It is certified that error appears in the above-identified patent and that said Letters Patent is hereby corrected as shown below:

On the Title page, Item (75) Inventors, line 2, delete "Marseilles (FR)" and insert --Marseille (FR)--.

In the Claims
In Col. 12, line 54, claim 8, delete "minors" and insert --mirrors--.

Signed and Sealed this
Sixth Day of May, 2014

Michelle K. Lee
*Deputy Director of the United States Patent and Trademark Office*